Patented July 17, 1951

2,560,825

UNITED STATES PATENT OFFICE 2,560,825

AUTOCONDENSATION PRODUCTS OF AN ARYLOXY AMINOTRIAZINE

Frederic Charles Schaefer, Stamford, Conn., assignor to American Cyanamid Company, New York, N. Y., a corporation of Maine No Drawing. Application March 30, 1948, Serial No. 18,063

15 Claims. (Cl. 260—249.5)

This invention relates to new autocondensation products and more particularly to autocondensation products of an aryloxy aminotriazine and to methods of preparing the same. The invention especially is concerned with products obtained by autocondensation (self-condensation) of a compound represented by the general formula

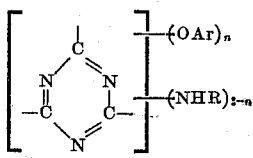

wherein Ar represents a monovalent, monocyclic aromatic hydrocarbon radical bonded to the oxygen atom through a carbon atom of the ring nucleus, R represents a member of the class consisting of hydrogen and monovalent hydrocarbon radicals, and $n$ represents an integer which is at least 1 and not more than 2. Thus, when $n$ represents 2, the autocondensation product is a polymeric material containing the structural unit

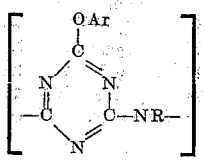

where Ar and R have the same meanings as given above with reference to Formula I.

Preferably R in Formulas I and IA represent a hydrogen atom, in which case the products may be defined as being autocondensation products of a compound represented by the general formula

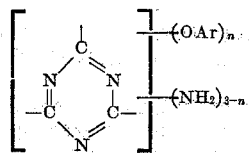

wherein Ar and $n$ have the same meanings as given above with reference to Formula I. However, there also may be produced in accordance with the present invention autocondensation products of a compound represented by the general formula

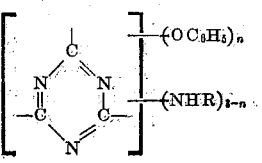

wherein R and $n$ have the same meanings as given above with reference to Formula I. When R in Formula III represents a hydrogen atom the compound which is subjected to autocondensation is a phenoxy amino-s-triazine, which may be represented by the general formula

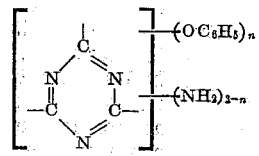

wherein $n$ has the same meaning as given above with reference to Formula I. The compounds embraced by Formula IV are 2-phenoxy-4,6-diamino-s-triazine and 2-amino-4,6-diphenoxy-s-triazine.

Illustrative examples of monovalent, monocyclic aromatic hydrocarbon radicals which Ar in Formulas I and II may represent are: phenyl, o-, m- and p-tolyl, 2,3-, 2,4-, 2,5-, 2,6-, 3,4- and 3,5-xylyl, 2,3-, 2,4-, 2,5-, 2,6- 3,4- and 3,5-diethylphenyl, 2,3,5-trimethylphenyl, 2,4,6-trimethylphenyl, 2,3,4,6-tetramethylphenyl, pentamethylphenyl, o-, m- and p-ethylphenyl, -propylphenyl, -isopropylphenyl, -n-butylphenyl, -isobutylphenyl, p-amylphenyl, p-octadecylphenyl, 2,3-dipropylphenyl, 2,4-dioctylphenyl, etc. Preferably Ar represents a phenyl radical. Illustrative examples of monovalent hydrocarbon radicals which R in Formulas I and III may represent are: aliphatic (e. g., methyl, ethyl, propyl, isopropyl, n-butyl, sec.-butyl, amyl, isoamyl, hexyl, octyl, decyl, dodecyl, octadecyl, allyl, methallyl, crotyl, butenyl, oleyl, linalyl, etc.), including cycloaliphatic (e. g., cyclopentyl, cyclopentenyl, cyclohexyl, cyclohexenyl, cycloheptyl, etc.); aryl (e. g., phenyl, biphenylyl or xenyl, naphthyl, etc.); aliphatic-substituted aryl (e. g., tolyl, xylyl, ethylphenyl, 2-butenylphenyl, tert.-butylphenyl, etc.); and aryl-substituted aliphatic (e. g., benzyl, cinnamyl, phenylethyl, phenylpropyl, etc.).

The present invention is based on my discovery that a new series of synthetic compositions can be prepared by autocondensing under heat an aryloxy aminotriazine of the kind embraced by Formula I. Products of this invention may be used, for example, as intermediates in the preparation of derivatives thereof. In general, they are linear polymeric materials which in some cases soften or melt above 200° C. Some of the products, e. g., those which contain a plurality of aldehyde-reactable amino (—NHR, specifically —NH₂) groups and/or aldehyde-reactable imino (—NH—)

groups, are especially suitable for use in the preparation of resinous materials of the thermoplastic or of the thermosetting or potentially thermosetting types or kinds; thus, such products may be condensed with, for instance, aldehydes including formaldehyde (or compounds engendering formaldehyde, e. g., hexamethylene tetramine, etc.), furfural, acrolein, etc., to yield condensation products having particular utility in the plastics and coating arts. Products which are essentially resinous in character as initially produced may be used as such, if desired, in the plastics and coating arts, e. g., as modifiers of melamine-formaldehyde, urea - melamine - formaldehyde, urea-formaldehyde, thiourea-formaldehyde and other resinous materials with which they are compatible or can be rendered compatible.

The products of the present invention are prepared by autocondensing under heat a compound of the kind embraced by Formula I. In all cases heating is carried out at a temperature sufficiently high to cause autocondensation of the aryloxy aminotriazine and the evolution of a phenol having an aromatic nucleus corresponding to that represented by Ar in Formulas I and II. If desired, the evolved phenol may be removed substantially completely from the reaction zone as it is formed; or, only a portion of it may be removed from the reaction zone; or, especially in the case of the higher boiling substituted phenols which split off when the aryloxy aminotriazine undergoing autocondensation is one in which the aryl radical of the aryloxy grouping is highly substituted or contains a high-molecular-weight aliphatic hydrocarbon substituent, all or a substantial portion of the evolved phenol may be allowed to remain in the reaction mass, and the entire mass subsequently may be reacted with an aldehyde, e. g., formaldehyde, to yield a complex resinous material.

If an autocondensation product which is free or substantially free from the phenol by-product of the reaction be desired, this may be done by removing the phenol by-product from the reaction zone as it is formed, as was pointed out hereinbefore; or, all or a substantial part of the phenol, as desired or as conditions may require, may be removed from the reaction mass at the end of the reaction period, for example, by extracting the phenol from the mass containing it with the aid of a suitable solvent.

The temperature at which the autocondensation reaction proceeds varies considerably depending largely upon the particular starting material employed and to a lesser degree upon its purity. In some cases heating the aryloxy aminotriazine only 1 or 2° C. above its melting point causes the reaction to start and phenol by-product to be evolved. With purer materials it is sometimes necessary to heat the aryloxy aminotriazine to a slightly higher temperature, for example from 5 to 8° C. above its melting point before the reaction is initiated. In the case of 2-amino-4,6-diphenoxy-s-triazine the autocondensation reaction proceeded satisfactorily at a temperature of the order of 280° to 300° C. With 2-phenoxy-4,6-diamino-s-triazine autocondensation of a sample melting at 248°–250° C. started at a temperature only 1°–2° C. above its melting point, while with a purer sample melting at 255°–258° C. autocondensation began when the sample was heated from 5°–8° C. above its melting point.

The reaction time may be varied considerably. The period of heating may be sufficiently long, if desired, so that the reaction proceeds to completion as evidenced by the fact that no more phenol by-product of the reaction is being evolved. Or, the reaction time may be of such limited duration that only a partial autocondensation product is obtained, that is to say, a product from which additional phenol could be split off if the product were heated further.

The chemical constitution of the autocondensation products of this invention will vary depending upon the completion of the reaction, as indicated in the preceding paragraph, and also upon the particular starting material employed. When the starting material is a monoamino (—NHR) diaryloxy-s-triazine the polymeric reaction product contains a unit which may be represented structurally as follows:

V 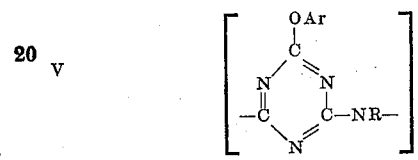

An autocondensation reaction of a monoaryloxy diamino-s-triazine may be illustrated graphically by the following equation:

VI 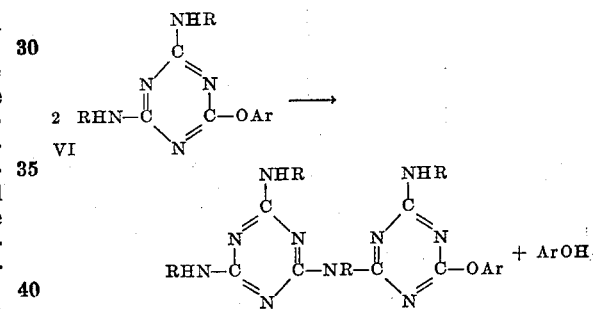

For purpose of simplicity the reaction has been shown as yielding merely a simple dimer. It will be understood, of course, that polymers of higher molecular weight also may be produced by autocondensation of a monoaryloxy diamino-s-triazine and that such polymers contain a unit which may be represented structurally as follows:

VII 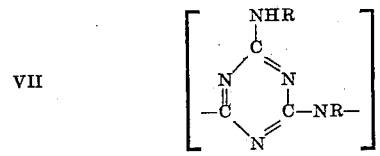

Ar in Formula V and Equation VI and R in Equation VI and Formulas V and VII have the same meanings as given above with reference to Formula I.

The aryloxy aminotriazines used in practicing my invention may be prepared by any suitable method. For example, they may be prepared by reacting a monoamino (—NHR) dichloro-s-triazine or a monochloro diamino [(NHR)₂] s-triazine with equivalent amounts of sodium phenoxide in aqueous systems at temperatures within the range of 0° to 100° C., and isolating the aryloxy aminotriazine thereby obtained.

In order that those skilled in the art better may understand how the present invention may be carried into effect, the following examples are given by way of illustration and not by way of limitation. All parts and percentages are by weight.

Example 1

One hundred parts of 2-amino-4,6-diphenoxy-s-triazine was heated at 280°-300° C. in a reaction vessel provided with an air reflux condenser. Boiling began in a few minutes and soon became vigorous, indicating that phenol was being evolved. Heating was continued for 1 hour. During the heating period no solid phase separated, but the reaction mass became progressively more viscous without darkening appreciably.

The reaction mass solidified to a hard, glassy product on cooling. This was extracted with anhydrous diethyl ether, and the extract was evaporated to yield an ether-free, liquid residue amounting to 25 to 30 parts. This residue had the odor of phenol and gave the characteristic violet color in the ferric chloride test for phenol. The yield of phenol obtained in this way was 75 to 90% of the theoretical amount.

After extracting the glassy reaction product with ether, a white, powdery autocondensation product resulted. This material melted (softened) at 220°-250° C. It was a polymer which contained the following structural unit:

VIII 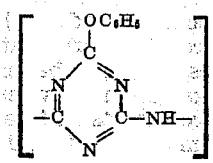

This material may be used alone or admixed with a filler (e. g., wood flour, alpha-cellulose, asbestos, etc.), dye, pigment, lubricant or other modifying agent as a molding composition from which useful molded articles can be produced.

Instead of using ether to extract the phenol from the reaction mass as above described, any other solvent or mixture of solvents which will dissolve phenol may be employed. Examples of such solvents are water, preferably hot water, ethyl alcohol, chloroform, glycerine, carbon disulfide, water and alcohol, water and glycerine, water and acetone, etc.

The 2-amino-4,6-diphenoxy-s-triazine used in the above example is prepared, for instance, by adding 3 moles of 2-amino-4,6-dichloro-s-triazine to a cold (10° C.) solution of 6 moles of phenol and 6 moles of sodium hydroxide in 3000 parts of water. The mixture is thoroughly stirred for 2 hours, during which time the reaction temperature is allowed to rise to about 25° C. The reaction mass is then heated at 90° to 95° C. for 4 hours. The resulting crude 2-amino-4,6-diphenoxy-s-triazine is filtered off, and the flaky crystals are washed well with water and with ethanol. The washed crystals, after drying at 110° C., melt at 173°-177° C. A purer product having a melting point of 181°-182° C. can be obtained by recrystallization of the less pure crystals from butanol using about 5 cc. of butanol per gram of 2-amino-4,6-diphenoxy-s-triazine.

In a manner similar to that described above with particular reference to the preparation of 2-amino-4,6-diphenoxy-s-triazine, other monoamino diaryloxy-s-triazines of the kind embraced by Formula I may be produced by using an equivalent amount of the appropriate substituted phenol instead of phenol itself.

Example 2

Fifteen parts of 2-phenoxy-4,6-diamino-triazine was placed in a reaction vessel equipped with an air reflux condenser, and was melted (fused) therein over an open flame. The compound formed a clear, colorless melt when heated carefully. When heating was continued for a few seconds, thereby increasing the temperature of the mass above the melting or fusion point of the compound, the melt began to boil violently (indicating the evolution of phenol) and partially resinified almost immediately. The non-resinous portion continued to boil for a few minutes while the reaction vessel was heated further. The total heating period was about 5 minutes.

After cooling the reaction mass it was extracted with anhydrous ethyl ether. The ether solution was evaporated as completely as possible, leaving a liquid reesidue which had the odor of phenol and gave the characteristic violet color in the ferric chloride test for phenol. A small portion of the product was converted to picric acid, M. P. 120°-122° C., thereby further establishing that phenol was a by-product of the reaction. The amount of phenol recovered in this way totaled 6 parts, which corresponds to about 75% of the theoretical.

The insoluble residue from the ether extraction was white in color, infusible and was insoluble in both hot and cold hydrochloric acid. It was a polymeric material which contained the following structural unit:

IX 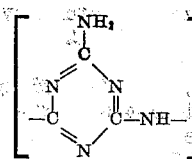

Instead of ether any other solvent or solvent mixture, numerous examples of which have been given hereinbefore, may be used to extract all or part of the phenol by-product from the reaction mass.

The 2-phenoxy-4,6-diamino-s-triazine used in the above example is prepared, for instance, by adding 1 mole of 2-chloro-4,6-diamino-s-triazine to 1.05 moles of phenol and 1.05 moles of sodium hydroxide pellets in 1000 parts of water. The mixture is stirred at room temperature for 30 minutes and is then heated under reflux for 4 hours at the boiling temperature of the mass. At the end of this period the crude 2-phenoxy-4,6-diamino-s-triazine which is produced is separated by hot filtration of the reaction mass, washed with water and with methanol, and dried at 105° C. The melting point of the crude product is 248°-250° C. By recrystallization from a large volume of butanol, a purer form of 2-phenoxy-4,6-diamino-s-triazine melting at 255°-258° C. can be obtained.

In a manner similar to that described above with particular reference to the preparation of 2-phenoxy-4,6-diamino-s-triazine, other monoaryloxy diamino-s-triazines of the kind embraced by Formula I may be produced by using an equivalent amount of the appropriate substituted phenol instead of phenol itself.

It will be understood, of course, by those skilled in the art that my invention is not limited to the use of the specific aryloxy aminotriazines named in the above illustrative examples in preparing new and useful synthetic compositions. Thus, instead of 2-amino-4,6-diphenoxy-s-triazine or 2-phenoxy-4,6-diamino-s-triazine, I may use any other compound of the kind embraced by Formula I in producing new autocondensation products, for example by heating the particular starting material employed at a temperature above its melting point. The temperature above its melting point to which the compound is heated may be as little as 0.5° or 1° C. thereabove or as much as 50° or 100° C. or more above its melting point. The autocondensation reaction may be effected under atmospheric, subatmospheric or superatmospheric pressure and in any suitable kind of a reaction vessel.

Illustrative examples of compounds which may be subject to autocondensation as hereinbefore described are:

2-(o-tolyloxy)-4,6-diamino-s-triazine
2-(m-tolyloxy)-4,6-di-(methylamino)-s-triazine
2-(p-tolyloxy)-4,6-dianilino-s-triazine
2-phenoxy-4,6-di-(ethylamino)-s-triazine
2-phenoxy-4,6-di-(benzylamino)-s-triazine
2-(2',3'-xyloxy)-4,6-diamino-s-triazine
2-(3',5'-xyloxy)-4,6 - di - (cyclohexylamino) - s-triazine
2-(3',4'-diethylphenoxy) - 4,6 - di-tolylamino)-s-triazine
2-(2',4',6'-trimethylphenoxy) - 4,6-di-(octylamino)-s-triazine
2-phenoxy-4,6-di-(allylamino)-s-triazine
2-amino-4,6-di-(m-tolyloxy)-s-triazine
2-methylamino)-4,6-diphenoxy-s-triazine
2-anilino-4,6-di-(o-tolyloxy)-s-triazine
2-(ethylamino)-4,6-di-(p-tolyloxy)-s-triazine
2-(benzylamino) - 4,6-di-(2',4' - xyloxy)-s-triazine
2-(allylamino)-4,6-di-(3',6'-xyloxy)-s-triazine
2-(cyclohexylamino)-4,6-di-(3',5' - diethylphenoxy)-s-triazine
2-(tolylamino)-4,6-di - (2',3',5' - trimethylphenoxy)-s-triazine
2-(hexylamino)-4,6-di-(2',4' - dibutylphenoxy)-s-triazine
2-(octylamino)-4,6-diphenoxy-s-triazine Other examples will be apparent to those skilled in the art from Formulas I, II, and III and from the examples hereinbefore given of radicals that Ar and R in these formulas may represent.

I claim:

1. An autocondensation product of a compound represented by the general formula

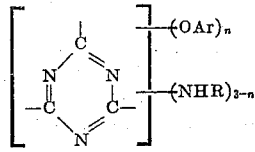

wherein Ar represents a monovalent, monocyclic aromatic hydrocarbon radical bonded to the oxygen atom through a carbon atom of the ring nucleus, R represents a member of the class consisting of hydrogen and monovalent hydrocarbon radicals, and n represents 2, said autocondensation product being a polymeric material containing the structural unit

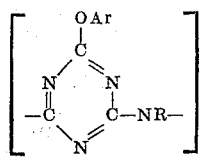

where Ar and R have the same meanings as given above.

2. An autocondensation product as in claim 1 wherein R represents hydrogen.

3. An autocondensation product as in claim 1 wherein Ar represents a phenyl radical.

4. An autocondensation product of 2-amino-4,6-diphenoxy-s-triazine, said autocondensation product being a polymeric material containing the structural unit

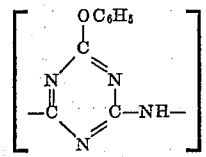

5. The method of preparing a new synthetic composition which comprises autocondensing under heat, at a temperature not less than 0.5° C. above its melting point, a compound represented by the general formula

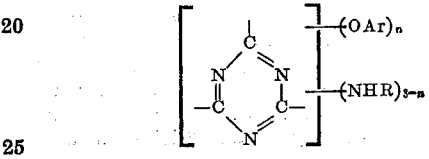

wherein Ar represents a monovalent, monocyclic aromatic hydrocarbon radical bonded to the oxygen atom through a carbon atom of the ring nucleus, R represents a member of the class consisting of hydrogen and monovalent hydrocarbon radicals, and n represents an integer which is at least 1 and not more than 2, and separating the evolved phenolic by-product from the reaction mass thereby to obtain the autocondensation product of the aforementioned compound in purified form.

6. The method of preparing a new synthetic composition which comprises heating a phenoxy amino-s-triazine at a temperature of from 0.5° C. to 100° C. above its melting point to cause autocondensation thereof and the evolution of phenol, and separating the evolved phenol from the reaction mass thereby to obtain an autocondensation product of the starting phenoxy amino-s-triazine in purified form.

7. The method of preparing a new synthetic composition which comprises heating 2-phenoxy-4,6-diamino-s-triazine at a temperature of from 1° C. to 50° C. above its melting point to cause autocondensation thereof and the evolution of phenol, and separating the evolved phenol from the reaction mass thereby to obtain an autocondensation product of 2-phenoxy-4,6-diamino-s-triazine in purified form.

8. The method of preparing a new synthetic composition which comprises heating 2-amino-4,6-diphenoxy-s-triazine at a temperature of from 1° C. to 50° C. above its melting point to cause autocondensation thereof and the evolution of phenol.

9. A method as in claim 8 which includes the additional step of removing the evolved phenol from the reaction mass containing the formed autocondensation product.

10. The method of forming an autocondensation product of 2-amino-4,6-diphenoxy-s-triazine which comprises heating said triazine at a temperature within the range of 280° C. to 300° C. whereby autocondensation of the said triazine is effected with the evolution of phenol as a by-product of the condensation reaction.

11. A method as in claim 10 which includes the additional step of removing the evolved phenol from the reaction mass containing the formed autocondensation product.

12. A composition of matter comprising phenol and the autocondensation product defined in claim 4, the amount of phenol which is present in the said composition not exceeding the amount which results as a by-product of the autocondensation of 2-amino-4,6-diphenoxy-s-triazine under heat.

13. A method as in claim 5 wherein the evolved phenolic by-product is separated from the reaction mass by extracting the mass with a solvent for the said by-product.

14. The method of preparing a new synthetic composition which comprises autocondensing under heat, at a temperature not less than 0.5° C. above its melting point, a compound represented by the general formula

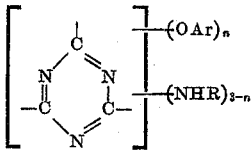

wherein Ar represents a monovalent, monocyclic aromatic hydrocarbon radical bonded to the oxygen atom through a carbon atom of the ring nucleus, R represents a member of the class consisting of hydrogen and monovalent hydrocarbon radicals, and $n$ represents 2.

15. The method of preparing a new synthetic composition which comprises autocondensing under heat, at a temperature not less than 0.5° C. above its melting point, a compound represented by the general formula

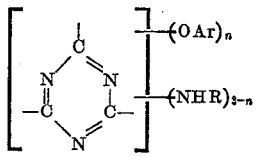

wherein Ar represents a monovalent, monocyclic aromatic hydrocarbon radical bonded to the oxygen atom through a carbon atom of the ring nucleus, R represents a member of the class consisting of hydrogen and monovalent hydrocarbon radicals, and $n$ represents 2, and separating the evolved phenolic by-product from the reaction mass thereby to obtain the autocondensation product of the aforementioned compound in purified form.

FREDERIC CHARLES SCHAEFER.

REFERENCES CITED

The following references are of record in the file of this patent:

Beilstein, vol. 26 (1937), 4th ed., p. 271.

Shriner and Fuson: Identification of Organic Compounds, 2nd ed. (1940), J. Wiley and Sons, pp. 85, 86 and 97.

Certificate of Correction

Patent No. 2,560,825                                              July 17, 1951

FREDERIC CHARLES SCHAEFER

It is hereby certified that error appears in the printed specification of the above numbered patent requiring correction as follows:

Column 5, line 74, for "diamino-triazine" read *diamino-s-triazine*; column 6, line 16, for "reesidue" read *residue*; column 7, line 13, for "subject" read *subjected*; line 23, for "di-tolylamino)-s-" read *di-(tolylamino)-s-*; line 30, for "2-methylamino)" read *2-(methylamino)*;

and that the said Letters Patent should be read as corrected above, so that the same may conform to the record of the case in the Patent Office.

Signed and sealed this 8th day of January, A. D. 1952.

[SEAL]

THOMAS F. MURPHY,
                                                                     *Assistant Commissioner of Patents.*